United States Patent Office 3,068,246
Patented Dec. 11, 1962

3,068,246
PROCESS FOR THE PRODUCTION OF
1-DEHYDROPROGESTERONE
Barney J. Magerlein, Kalamazoo, and Alan H. Nathan,
Kalamazoo Township, Kalamazoo County, Mich., assignors to The Upjohn Company, Kalamazoo, Mich.,
a corporation of Michigan
No Drawing. Filed Apr. 14, 1958, Ser. No. 728,075
16 Claims. (Cl. 260—397.3)

This invention relates to novel steroid compounds and is more particularly concerned with processes for the production of 1-dehydroprogesterone and the novel steroid intermediates 2-halo-20α-hydroxy-4-pregnen-3-one, 2 - halo - 20β - hydroxy-4-pregnen-3-one, 20α-hydroxy, 1,4-pregnadien-3-one and 20β-hydroxy-1,4-pregnadien-3-one produced and used in the preparation thereof.

It is an object of the present invention to provide a process for the production of 1-dehydroprogesterone and novel intermediates used in the production thereof. Other objects will be apparent to those skilled in the art to which this invention pertains.

The process, product, and novel intermediates of the present invention may be illustratively represented by the following formulae:

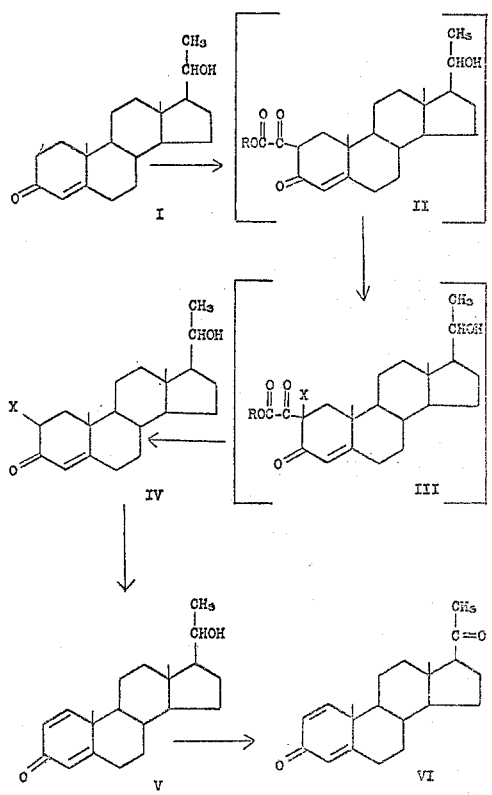

wherein R is selected from the group consisting of hydrogen and an alkyl group which is preferably lower-alkyl and X is a halogen having an atomic weight of from 35 to 127 such as chlorine, bromine, and iodine. The term "lower-alkyl" represents an alkyl group containing from one to eight carbon atoms, inclusive, for example, methyl, ethyl, propyl, butyl, isobutyl, amyl, hexyl, heptyl, octyl, or the like.

The compounds of Formula IV, for example, 2-bromo-20α-hydroxy-4-pregnen-3-one and 2-bromo-20β-hydroxy-4-pregnen-3-one, and of Formula V, for example, 20α-hydroxy - 1,4-pregnadien-3-one and 20β-hydroxy-1,4-pregnadien-3-one, are useful as intermediates in the production of 1-dehydroprogesterone, Compound VI, which possesses progestational activity. The compounds of Formula IV (e.g., 2-bromo-20α-hydroxy-4-pregnen-3-one and 2-bromo-20β-hydroxy-4-pregnen-3-one) and Formula V (e.g., 20α-hydroxy-1,4-pregnadien-3-one and 20β-hydroxy-1,4-pregnadien-3-one) possess progestational activity. They, like 1-dehydroprogesterone, affect the secretion of gonadotropins and thus regulate ovulation and endometrial and placental development and, particularly when used in conjunction with estrogens, e.g., "ethinylestradiol" and/or androgens, e.g., 9α-fluoro-11β-hydroxy-17-methyltestosterone reduce fertility, and constitute effective therapy for dysmenorrhea, amenorrhea, endometriosis, threatened abortion and related gynecological disorders. Administration of the compounds of Formulae IV, V and VI can be in conventional dosage forms, such as pills, tablets, capsules, syrups or elixirs for oral use, or in liquid forms which are adaptable to the natural and synthetic steroid hormones for injectable products.

The process of the instant invention comprises: treating the compounds of Formula I, such as 20β-hydroxy-4-pregnen-3-one and 20α-hydroxy-4-pregnen-3-one, with an alkyl diester of oxalic acid, for example, methyl oxalate, ethyl oxalate, and the propyl, isopropyl, butyl, isobutyl, amyl, hexyl, heptyl, and octyl esters of oxalic acid, and the like, an an alkali-metal base condensing agent, preferably an excess of each reagent, to produce a reaction product which contains the alkali-metal enolates of 2-alkoxy-oxalyl-20β-hydroxy-4-pregnen-3-one and 2-alkoxy-oxalyl-20α-hydroxy-4-pregnen-3-one. This step is usually performed in a solvent, such as a primary alcohol, for example, methanol and ethanol, a secondary alcohol, for example, isopropyl alcohol and secondary butyl alcohol, a tertiary alcohol, for example, tertiary butyl alcohol and tertiary amyl alcohol, or other inert organic solvents, for example, benzene, dioxane, tetrahydrofuran, ether, Skellysolve B hexanes or mixtures of these or other essentially non-reactive solvents, tertiary butyl alcohol being preferred.

Alkali-metal base condensation agents which may be used include the alkali-metal alkoxides, e.g., sodium methoxide, sodium ethoxide, potassium ethoxide, potassium tertiary butoxide, lithium methoxide, and the like, the alkali metals, the alkali-metal hydrides such as sodium hydride, and the alkyl alkali metals, e.g., sodium amide, triphenyl methyl sodium, and the like. Of these, sodium methoxide and sodium ethoxide are preferred for their convenience and consistently good results. The alkali-metal alkoxide may be used solvent-free, dissolved or suspended in a non-reactive solvent, or in situ in the alkanol in which said alkali-metal alkoxide was prepared. When potassium is used, it is usually used as the solution formed by its reaction with tertiary butyl alcohol according to procedures well known in the art.

The reaction can be carried out at temperatures of from minus eighty to plus 120 degrees centigrade, temperatures of plus twenty to plus 65 degrees centigrade being preferred.

The compounds of Formula I can be carboxylated, as disclosed above, or alternatively, they can be trifluoroacetylated, using a trifluoroacetylating agent such as ethyl trifluoroacetate or formylated to produce the various corresponding 2-carbonyl derivative, thus activating the 2-position.

The alkali-metal enolates are then converted to the compounds of Formula II, such as 2-alkoxyoxalyl-20β-hydroxy-4-pregnen-3-ones and 2-alkoxyoxalyl - 20α - hydroxy-4-pregnen-3-ones by the addition of an acidifying agent, such as an organic acid, and preferably a buffered acidifying agent containing a mixture of acetic acid and sodium acetate.

The compounds of Formula II are then treated with a halogenating agent in an organic solvent which is non-reactive under the conditions of reaction to convert them into the compounds of Formula III such as 2-halo-2-alkoxy-oxalyl-20β-hydroxy-4-pregnen-3-ones and 2-halo-2-alkoxy-oxalyl-20α-hydroxy-4-pregnen-3-ones. Methanol and ethanol have been found to be particularly useful solvents and are usually preferred, although chloroform or methylene chloride in the presence of pyridine, acetic acid in the presence of potassium acetate, and others may also be used. Since the presence of a base, e.g., an alkali-metal salt of an aliphatic acid, of carbonic acid, e.g., sodium carbonate, sodium bicarbonate, or the like, appears to enhance the yield of desired product, the halogenation can be conducted in the presence of a mild base, especially potassium or sodium acetate.

The halogenating agents are halogens having an atomic weight from 35 to 127, i.e., chlorine, bromide, or iodine. When bromine is used as the halogenating agent, it may be added without a diluent or dissolved in an organic solvent such as methanol, chloroform, methylene chloride, or the like. When chlorine is used, it may be bubbled into the reaction mixture or used as a solution of the gas in an organic solvent. Iodine, when used as the halogenating agent, may be introduced in methylene chloride, chloroform, carbon tetarchloride, ethanol, or in any other convenient form.

In carrying out the halogenation reaction, preferably about one mole of halogen to one mole of steroid is employed. The reaction can be carried out at temperatures between about minus twenty and plus eighty degrees centigrade, temperatures around zero degrees centigrade being preferred.

The compounds of Formula III are then subjected to an elimination reaction to convert them into the compounds of Formula IV such as 2-halo-20β-hydroxy-4-pregnen-3-one and 2-halo-20α-hydroxy-4-pregnen-3-one, by removing the 2-alkoxyoxalyl group by reaction with a base. Suitable reagents to effect the elimination are the alkali-metal alkoxides such as, for example, sodium methoxide, sodium ethoxide, potassium isopropoxide, potassium tertiary butoxide, the alkali-metal hydroxides, such as, for example, potassium hydroxide, sodium hydroxide and lithium hydroxide, basic alkali-metal salts, such as, for example, sodium acetate, sodium carbonate, and the like. Still other reagents which can be used include bases, such as, for example, trimethylbenzyl ammonium hydroxide, calcium carbonate, silver oxide, and the like.

The compounds of Formula IV are then dehydrohalogenated as will be described in detail below to produce the compounds of Formula V such as 20β-hydroxy-1,4-pregnadien-3-one and 20α-hydroxy-1,4-pregnadien-3-one.

The dehydrohalogenation reaction can be carried out by dissolving the compounds of Formula IV in the dehydrohalogenation agent, if the latter is a liquid solvent for the 2-halosteroid starting compound of Formula IV, or both the dehydrohalogenation agent and the steroid are dissolved in a substantially inert diluent and then heated, usually at a temperature substantially above room temperature, e.g., between about fifty and 250 degrees centigrade, for about fifteen minutes to several hours, although the reaction ordinarily begins as soon as the heating commences. 2,4,6-trimethylpyridine (γ-collidine) is an example of an especially suitable dehydrohalogenation agent, and when used, the reaction is usually performed at about the boiling point of the 2,4,6-trimethylpyridine, unless an organic diluent is employed. Ordinarily, the dehydrohalogenation agent is employed in a molar ratio to the 2-halo steroid starting compound of Formula IV of one to one or greater.

Dehydrohalogenating agents which may be employed include lithium chloride in dimethylformamide, potassium acetate, pyridine and the alkyl pyridines, e.g., the picolines, β-lutidines, α,β-collidines, γ-collidines, parvulines, parvolines, and the like. Of the dehydrohalogenation agents, lithium chloride and sym. γ-collodine, vis., 2,4,6-trimethylpyridine, give outstandingly superior results and are the dehydrohalogenation agents of choice for the conversion of the compounds of Formula IV to the compounds of Formula V.

The compounds of Formula V are recovered, following acidification of the dehydrohalogenation reaction mixture with a mineral acid, such as, for example, dilute hydrochloric acid, by conventional means such as by extraction with a solvent, for example, methylene chloride, or by chromatography or both as deemed necessary.

The thus-obtained compounds of Formula V are then oxidized to the compound of Formula VI, 1-dehydroprogesterone, the oxidation generally being carried out in a conventional manner, such as, for example, by treating the compounds of Formula V in acetic acid solution with an oxidizing agent (preferably a slight excess thereof) e.g., chromium trioxide, sodium dichromate, or by oxidizing with a haloamide or a haloimide of an acid, such as N-bromoacetamide, N-chlorosuccinimide or N-bromosuccinimide dissolved in pyridine, dioxane or other suitable solvents, or by means of an Oppenauer-type oxidation. After termination of the oxidation reaction, the oxidant is generally destroyed by addition of an arresting agent such as methyl alcohol, ethyl alcohol, or the like, for the chromic acid oxidant or a bisulfite for the chromic acid oxidant, N-bromoacetamide, N-bromosuccinimide and other N-haloacylamides and N-haloacylimides. Thereafter, the resulting 1-dehydroprogesterone is recovered by conventional means, such as by extraction with water-immissible solvents, e.g., methylene chloride, ethylene chloride, chloroform, carbon tetrachloride, ether, benzene, toluene, or the like, or by chromatography.

If the oxidizing agent is a haloamide or a haloimide of a carboxylic acid, the oxidant can be destroyed, following the reaction, by treating the reaction mixture with sulfur dioxide in the form of gaseous or liquid sulfur dioxide or by a material which, in situ, produces sulfur dioxide, as, for example, an alkali-metal hpyosulfite. These oxidant destroying treatments can be substituted for the bisulfite treatment above.

20β-hydroxy-1,4-pregnadien-3-one and 20α-hydroxy-1,4-pregnadien-3-one, the compounds of Formula V, or mixtures of the two epimers can be oxidized to 1-dehydroprogesterone since the epimeric center at C–20 is abolished by the final oxidation.

The following examples are illustrative of the process and products of the present invention, but are not to be construed as limiting.

EXAMPLE 1

A. *2-Bromo-20β-Hydroxy-4-Pregnen-3-One (Compound IVβ)*

A solution of 1.605 grams of 20β-hydroxy-4-pregnen-3-one [Turner et al., J. Am. Chem. Soc. 73, 2283 (1951)], Compound Iβ, in 25 milliliters of tertiary butyl alcohol was treated successively with 1.39 milliliters of ethyl oxalate and 2.19 grams of a 25 percent methanolic solution of sodium methoxide to give the sodium enolate of 2-ethoxy-oxalyl-20β-hydroxy-4-pregnen-3-one, the reaction mixture turning yellow and then greenish black. The reaction mixture was kept at room temperature under nitrogen for a period of one and one-half hours followed by the addition thereto of a cold solution of 0.62 gram of sodium acetate and 0.61 gram of acetic acid in 32 milliliters of methanol to convert the sodium enolate of of 2-ethoxyoxalyl-20β-hydroxy-4-pregnen-3-one into 2-ethoxy-oxalyl-20β-hydroxy-4-pregnen-3-one, Compound IIβ. The mixture thus obtained was held at zero degrees centigrade while a solution of 1.62 grams of bromine in sixteen milliliters of methanol was added over a period of one-half hour to convert Compound IIβ into 2 - bromo - 2 - ethoxy - oxalyl - 20β - hydroxy - 4 - pregnen-3-one, Compound IIIβ. An excess (one to two grams) of sodium acetate was added and the reaction mixture was stirred for a period of one hour and then poured into water whereupon a white amorphous solid material precipitated. The crude solid material, chiefly 2-bromo-20β-hydroxy-4-pregnen-3-one, Compound IVβ, was isolated to give a yield of 2.06 grams. The crude solid material melted at about 90–95 degrees centigrade, turning black at 140–150 degrees centigrade.

In like manner other 2-alkoxyoxalyl-20β-hydroxy-4-pregnen-3-ones are prepared by the substitution of the selected alkyl oxalate for the ethyl oxalate used in the above example. Compounds thus-prepared include those wherein the alkoxy group is lowerlalkoxy, e.g., methoxy, propoxy, butoxy, amyloxy, hexyloxy, heptyloxy, octyloxy, and the like.

Chlorine or iodine can be substituted for bromine in the above example to convert 2-ethoxyoxalyl-20β-hydroxy-4-pregnen-3-one and other 2-alkoxyoxalyl-20β-hydroxy-4-pregnen-3-ones into 2-chloro-2-ethoxyoxalyl-20β-hydroxy-4-pregnen-3-one, 2-iodo-2-ethoxyoxalyl-20β-hydroxy-4-pregnen-3-one and other 2-chloro- and 2-iodo-alkoxyoxalyl-20β-hydroxy-4-pregnen-3-ones, which in turn can be converted into 2-chloro-20β-hydroxy-4-pregnen-3-one and 2-iodo-20β-hydroxy-4-pregnen-3-one by following further the procedure of Example 1.

B. 20β-Hydroxy-1,4-Pregnadien-3-One (Compound Vβ)

The crude solid material containing Compound IVβ, obtained in Example 1, Part A, above, was boiled in thirteen milliliters of γ-collidine (2,4,6-trimethylpyridine) for a period of 45 minutes. The reaction mixture was cooled, acidified with hydrochloric acid and extracted with methylene chloride. The product was isolated and purified by chromatography on eighty grams of Florisil (synthetic magnesium silicate), eluting with 150-milliliter portions of four, six, eight and ten percent acetone in Skellysolve B hexanes (five fractions of each strength).

The eight and ten percent acetone fractions were combined and the solvent evaporated to yield 0.755 gram of crystalline product, consisting primarily of 20β-hydroxy-1,4-pregadien-3-one, Compound Vβ, having a melting point of 178–186 degrees centigrade. The infrared spectrum of Compound Vβ was in agreement with the formula proposed and the Beilstein test showed no bromine to be present.

C. 1-Dehydroprogesterone (Compound VI)

A solution of 300 milligrams of the crystalline product containing Compound Vβ obtained in Example 1, Part B, above, in eight milliliters of acetic acid was treated with eighty milligrams of chromic anhydride in eight milliliters of acetic acid at room temperature for a period of one and one-half hours. A few drops of methanol were added to the reaction mixture and the oxidation product was extracted with several portions of methylene chloride. After washing with potassium carbonate and water and brief drying over sodium sulfate, the methylene chloride extracts were evaporated. The residue (140 milligrams) melted at 136–148 degrees centigrade. The residue was recrystallized successively from methanol, acetone-ether and ethyl acetate to give 1-dehydroprogesterone, Compound VI, having a melting point of 152–153.5 degrees centigrade.

*Analysis.* — Calcd. for $C_{21}H_{28}O_2$: C, 80.73; H, 9.03. Found: C, 80.74; H, 9.10.

Infrared analysis showed the prescence of bands expected for 1-dehydroprogesterone and the main peak absorption in the ultraviolet was at 245 millimicrons.

EXAMPLE 2

A. 2-Bromo-20α-Hydroxy-4-Pregnen-3-One (Compound IVα)

20α-hydroxy-4-pregnen-3-one [Turner et al., J. Am. Chem. Soc. 75, 2283 (1951)], Compound Iα, is substituted for Compound Iβ in the procedure of Example 1, Part A. There is obtained in successive order, the sodium enolate of 2-ethoxyoxalyl-20α-hydroxy-4-pregnen-3-one, 2-ethoxyoxalyl-20α-hydroxy-4-pregnen-3-one (Compound IIα), 2-bromo-2-ethoxyoxalyl-20α-hydroxy-4-pregnen-3-one (Compound IIIα) and a crude material containing chiefly 2-bromo-20α-hydroxy-4-pregnen-3-one (Compound IVα).

Similarly, other alkyl oxalates, such as those named in Example 1, can be substituted for ethyl oxalate to obtain other 2-alkoxyoxalyl-20α-hydroxy-4-pregnen-3-ones.

By substituting chlorine or iodine for bromine, and following further the procedure of Example 1, there can be obtained 2-chloro- or 2-iodo-2-ethoxyoxalyl-20α-hydroxy-4-pregnen-3-one or 2-chloro- or 2-iodo-2-alkoxy-oxalyl-20α-hydroxy-4-pregnen-3-ones. By further treatment of these compounds, according to the procedure of Example 1, there can be obtained 2-chloro-20α-hydroxy-4-pregnen-3-one and 2-iodo-20α-hydroxy-4-pregnen-3-one.

B. 20α-Hydroxy-1,4-Pregnadien-3-One (Compound Vα)

The crude material containing Compound IVα is substituted for the crude material containing Compound IVβ in the procedure of Example 1, Part B, to obtain a product containing primarily 20α-hydroxy-1,4-pregnadien-3-one, Compound Vα.

C. 1-Dehydroprogesterone (Compound VI)

The product containing Compound Vα is substituted for the product containing Compound Vβ in the procedure of Example 1, Part C, to obtain 1-dehydroprogesterone.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A process comprising the steps of (1) reacting 20-hydroxy-4-pregnen-3-one with an alkali-metal base condensing agent and an alkyl diester of oxalic acid to produce an alkali-metal enolate of 2-alkoxyoxalyl-20-hydroxy-4-pregnen-3-one; and (2) reacting the latter compound with a halogen having an atomic weight of from 35 to 127, inclusive, to produce 2-halo-2-alkoxyoxalyl-20-hydroxy-4-pregnen-3-one; and (3) reacting the latter compound with an alkali-metal compound selected from the group consisting of alkali-metal alkoxides, alkali-metal hydroxides, and basic alkali-metal salts to produce 2-halo-20-hydroxy-4-pregnen-3-one; and (4) reacting the thus-produced 2-halogenated steroid with a dehydrohalogenating agent to produce 20-hydroxy-1,4-pregnadien-3-one; and (5) oxidizing the last named compound to produce 1-dehydroprogesterone.

2. The process of claim 1 in which the alkali-metal base condensing agent is sodium methoxide, the halogen is bromine, and the alkali-metal compound is sodium acetate.

3. The process of claim 2 in which the starting compound is 20β-hydroxy-4-pregnen-3-one.

4. The process of claim 2 in which the starting compound is 20α-hydroxy-4-pregnen-3-one.

5. A process which comprises the steps of (1) reacting 20-hydroxy-4-pregnen-3-one with an alkali-metal base condensing agent and an alkyl diester of oxalic acid to produce an alkali-metal enolate of 2-alkoxyoxalyl-20-hydroxy-4-pregnen-3-one; and (2) reacting the latter compound with a halogen having an atomic weight of from 35 to 127, inclusive, to produce 2-halo-2-alkoxyoxalyl-20-hydroxy-4-pregnen-3-one; and (3) reacting the latter compound with an alkali-metal compound selected from the group consisting of alkali-metal alkoxides, alkali-metal hydroxides, and basic alkali-metal salts to produce 2-halo-20-hydroxy-4-pregnen-3-one; and (4) reacting the thus-produced 2-halogenated steroid with a dehydrohalogenating agent to produce 20-hydroxy-1,4-pregnadien-3-one.

6. The process of claim 5 in which the alkali-metal base condensing agent is sodium methoxide, the halogen is bromine, and the alkali-metal compound is sodium acetate.

7. The process of claim 6 in which the starting compound is 20$\beta$-hydroxy-4-pregnen-3-one.

8. The process of claim 6 in which the starting compound is 20$\alpha$-hydroxy-4-pregnen-3-one.

9. A process which comprises the steps of (1) reacting a 20-hydroxy-4-pregnen-3-one with an alkali-metal base condensing agent and an alkyl diester of oxalic acid to produce an alkali-metal enolate of 2-alkoxyoxalyl-20-hydroxy-4-pregnen-3-one; and (2) reacting the latter compound with a halogen having an atomic weight of from 35 to 127, inclusive, to produce 2-halo-2-alkoxyoxalyl-20-hydroxy-4-pregnen-3-one; and (3) reacting the latter compound with an alkali-metal compound selected from the group consisting of alkali-metal alkoxides, alkali-metal hydroxides, and basic alkali-metal salts to produce 2-halo-20-hydroxy-4-pregnen-3-one.

10. The process of claim 9 in which the alkali-metal base is sodium methoxide, the halogen is bromine, and the alkali-metal compound is sodium acetate.

11. The process of claim 10 in which the starting compound is 20$\beta$-hydroxy-4-pregnen-3-one.

12. The process of claim 10 in which the starting compound is 20$\alpha$-hydroxy-4-pregnen-3-one.

13. A process for the production of 20-hydroxy-1,4-pregnadien-3-one which comprises reacting 2-halo-20-hydroxy-4-pregnen-3-one with a dehydrohalogenating agent, the halo substitutent representing a halogen having an atomic weight of from 35 to 127, inclusive.

14. The process of claim 13 in which the dehydrohalogenating agent is $\gamma$-collidine and the halogen is bromine.

15. The process of claim 14 in which the starting compound is 2-bromo-20$\beta$-hydroxy-4-pregnen-3-one.

16. The process of claim 14 in which the starting compound is 2-bromo-20$\alpha$-hydroxy-4-pregnen-3-one.

References Cited in the file of this patent

UNITED STATES PATENTS

| | | |
|---|---|---|
| 2,862,011 | Hogg et al. | Nov. 25, 1958 |
| 2,979,516 | Djerassi et al. | Apr. 11, 1961 |